Feb. 26, 1957 M. HETZEL 2,782,627
DEVICE FOR MEASURING THE AMPLITUDE OF
THE VIBRATIONS OF A WATCH ESCAPEMENT
Filed March 13, 1953 2 Sheets-Sheet 1

Inventor
Max Hetzel
by Karl Michaelis, atty.

Feb. 26, 1957 M. HETZEL 2,782,627
DEVICE FOR MEASURING THE AMPLITUDE OF
THE VIBRATIONS OF A WATCH ESCAPEMENT
Filed March 13, 1953 2 Sheets-Sheet 2
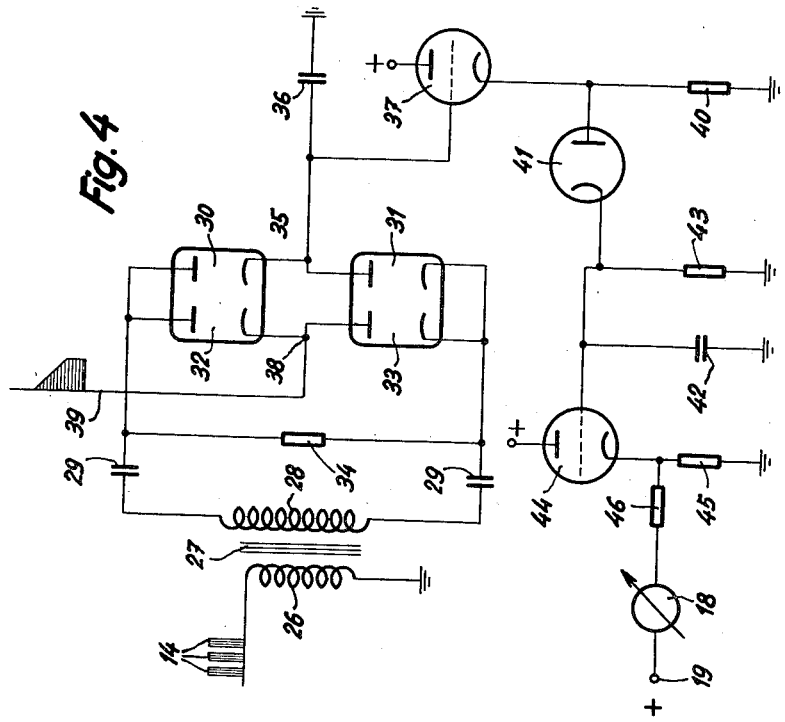
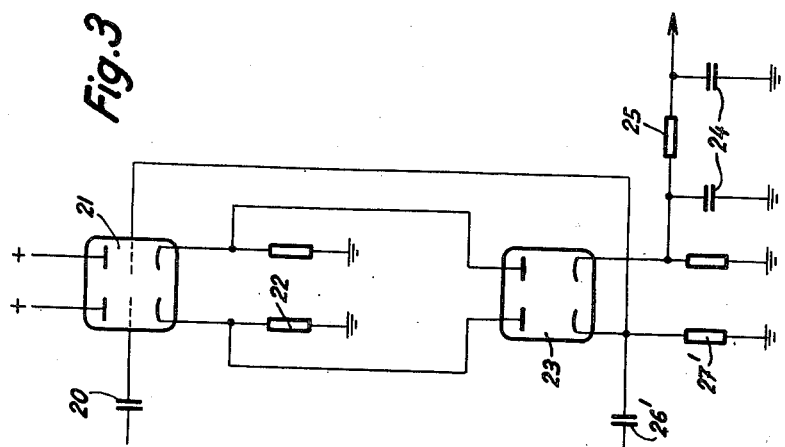
Inventor
Max Hetzel
by Karl Michaelis
atty.

United States Patent Office 2,782,627
Patented Feb. 26, 1957

2,782,627

DEVICE FOR MEASURING THE AMPLITUDE OF THE VIBRATIONS OF A WATCH ESCAPEMENT

Max Hetzel, Bienne, Switzerland, assignor to Bulova Watch Company Inc., New York, Bienne Branch, Bienne, Switzerland, a joint-stock company Application March 13, 1953, Serial No. 342,109

Claims priority, application Switzerland May 19, 1952

2 Claims. (Cl. 73—6)

This invention relates to a device for measuring the amplitude of the vibrations of the regulating device of a watch.

It is an object of this invention to test the operation of an assembled watch, not only with respect to the accuracy of the movement, but also to find out whether the amplitudes of the vibrations of the balance are normal, for only the result of this test guarantees that the watch has been assembled correctly and will run indefinitely without disturbance.

It is another object of this invention to provide a device which allows to carry out the measuring of the amplitude of the vibrations of the regulating device in an assembled watch.

The new device is founded on the fact that the amplitude of the vibrations of the balance is inversely proportional to the time difference between the disengaging of the escapement wheel and the hitting of the rest surface and that an indication as to the amplitude can be derived from the measurement of this time difference. Between the two magnitudes there exists theoretically a hyperbolic connection, but since the amplitudes to be considered are limited to a relatively small range, a linear relation between their magnitudes will be assumed for the purpose of the following discussion of this invention.

According to the invention I form an electrical measuring quantity proportional to the time difference between the mechanical pulsations produced by the disengagement and the hitting of the rest surface by the escapement wheel.

By measuring the difference between the measuring quantity proportional to the time difference and a constant voltage I obtain an indication which decreases in proportion to the increase in the time difference and thus obtain an indication of a smaller amplitude. However, if the time difference is small and therefore the amplitude is large, the measuring quantity will be small, so that the difference between the constant voltage and the measuring quantity is large and the measuring instrument indicates a large amplitude.

In accordance with this invention the device for measuring the vibration amplitude of a watch comprises a testing device controlled by electrical impulses derived from the mechanical pulsations of the watch and a storing device connected with a voltage source which is excited by the first impulse and generates a voltage increasing linearly and an indicating instrument indicating the difference between a constant voltage and a voltage proportional to the peak voltage of the storing device.

In the drawings affixed to this specification and forming part thereof an embodiment of the device according to this invention is illustrated diagrammatically by way of example.

In the drawings

Fig. 3 is a wiring diagram of the level control stage forming part of Fig. 1, and Fig. 4 is a wiring diagram of the testing device, the storing device and the indicating device forming part of Fig. 1.

Figures 1, 2:
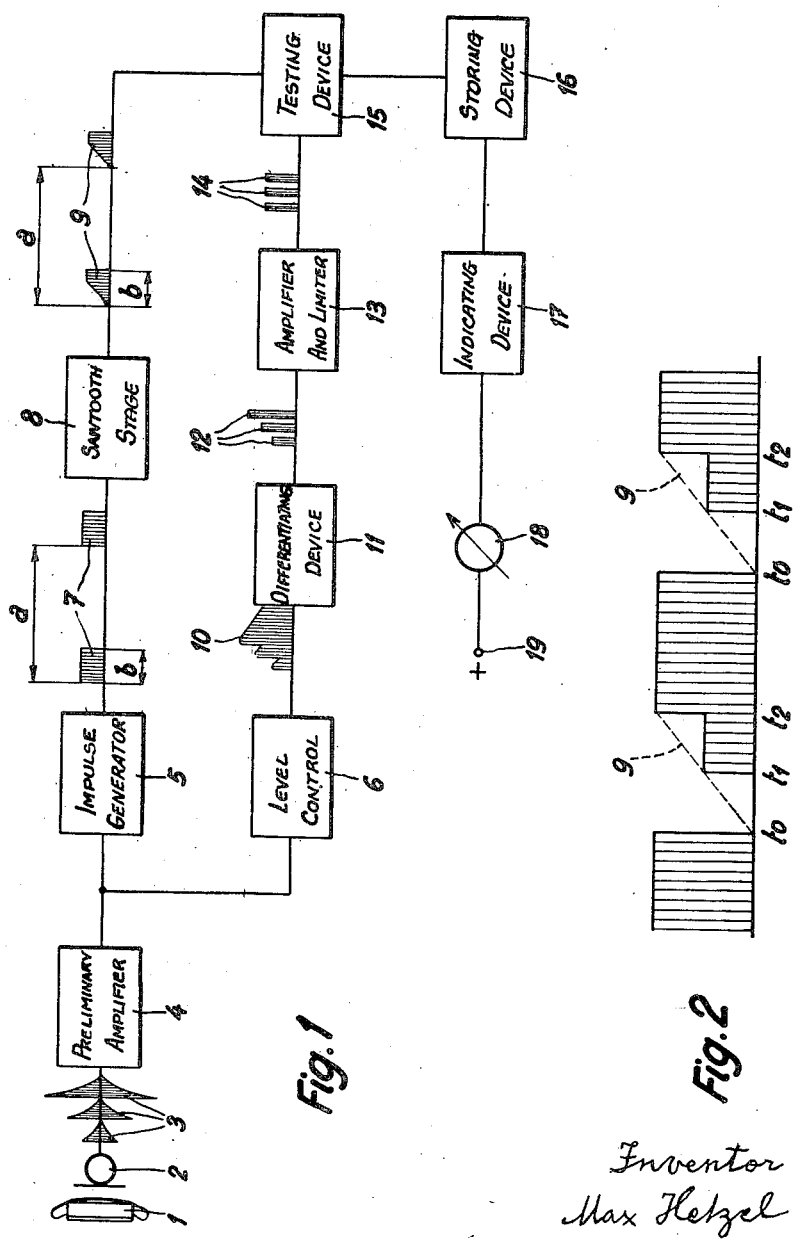
Fig. 1 is a block diagram of the device.
Fig. 2 shows the voltage curve of the storing device forming part of Fig. 1.

Referring to the drawings and first to Fig. 1, 1 is the watch to be tested. It is arranged within the range of a microphone 2 of the device. At each half period of the vibrations of the balance the watch supplies three mechanical pulsations which are produced by the disengagement or the beating of the ellipse against the fork, the hitting of the leg against the horn, and the hitting of the escapement wheel against the rest surface. These mechanical pulsations are not sharply defined impulses, but trains of damped oscillations caused by the mechanical resonances of the watch and the microphone. The microphone 2 thus supplies voltages such as those denoted by 3 in Fig. 1. These voltages are amplified and differentiated once in a preliminary amplifier 4 in order to bring out more clearly the increase at the beginning of the impulses. The amplified voltages are supplied to an impulse generator 5 and a level control stage 6. The impulse generator is formed as a blocking stage. It responds to each first impulse of the voltages 3 and supplies a rectangular impulse 7. The subsequent voltage impulses are rendered ineffective by the blocking stage 5, which is so adjusted that the impulse supplied by it is shorter than half the period of the regulating device. In consequence thereof when the next impulse series 3 arrives the blocking stage 5 is again in the initial condition and can respond to the first impulse thereof in order to yield a new impulse.

The impulses 7 of the impulse generator 5 are supplied to a sawtooth stage 8 which is controlled by the impulses 7 in such manner that at each beginning of the impulse 7 the sawtooth impulse 9 supplied by the sawtooth stage 8 commences. The sawtooth impulses 9 are limited to a definite amplitude by means of a limiter (not shown).

The voltages 3 are rectified by the level control stage 6. The time constant of the rectifier of the level control stage 6, to be described hereinafter, is larger than the time constant of the fading constant of the trains of impulses caused by the resonances of the watch and the microphone.

Fig. 3 shows the wiring diagram of the level control stage 6. The voltage 3 is fed via the condenser 20 to the left grid of the double triode 21. On the cathode resistor 22 of this triode a corresponding voltage is generated which is rectified in the left diode of the double diode 23. The rectified voltage is returned to the right grid of the double triode 21 and is again rectified by the right diode of the double diode 23. On principle one rectification would be sufficient; however, the double rectification involves the advantage that the sides of the output signal are better accentuated. By means of the filter chain formed by the condensers 24 and the resistor 25 and the RC members 26', 27' the short oscillations are suppressed in the output voltage of the level control stage. Thus at the output of the level control stage a rectified voltage 10 is generated which increases steeply at each impulse front of the voltage 3 and then decreases slightly.

If this voltage is differentiated in the differentiating device 11, three sharp impulse peaks 12 having unequal heights are generated. These impulses are fed to an amplifier and limiter 13 which yields three impulses 14 having equal heights. These three impulses as well as the sawtooth impulses are fed to a testing device 15, the output of which is applied to a storing device 16. The output of the storing device 16 is fed to an indicating device 17.

Fig. 4 shows a wiring diagram of the testing device 15, the storing device 16, and the indicating device 17. The impulses 14 are fed to the primary 26 of a transformer 27 having a secondary 28 to which two pairs of cascaded diodes 30, 31 and 32, 33 and a balancing resistor 34 are connected via condensers 29. The midpoint 35 of the cascade formed by the diodes 30 and 31 is connected to the storing device 16, formed by a condenser 36, and to the grid of a triode 37. The midpoint 38 of the cascade formed by the diodes 32 and 33 is fed with the sawtooth impulses 9 via a conductor 39.

The voltage appearing across the cathode resistor 40 of the tube 37 is rectified by a diode 41 so that a condenser, 42, to which a relatively high ohmic resistor 43 is connected in parallel, is always charged by the maximum voltage across the cathode resistor 40. The cathode of the diode 41 is connected to the grid of a triode 44. Across the cathode resistor 45 of the triode 44 practically the same voltage appears as across the condenser 42. An indicating instrument 18 is connected via a resistor 46 to the cathode of the tube 44.

The device described operates as follows:

By each impulse 14 a high voltage impulse is generated in the secondary 28 of the transformer 27 which renders the diodes 32, 33 conductive. In consequence thereof the midpoints 35 and 38 are, as it were, connected to each other by a low ohmic resistance and the condenser 36 is charged by the voltage prevailing in the conductor 39.

It is easy to see that the sawtooth voltage always equals zero at the moment when the first impulse arrives, so that the storing device formed by the condenser 36 is always discharged by this first impulse. Fig. 2 shows the voltage across the storing device 36 as a function of time. At the time $t_0$ corresponding to the arrival of the first impulse the voltage is always reduced to zero. At the time $t_1$ the second impulse arrives and imparts to the storing device a sawtooth voltage 9 corresponding to the midpoint of the dotted lines. At the moment $t_2$ the storing device is correspondingly imparted the momentary sawtooth voltage 9 corresponding to the sawtooth potential.

This voltage is now proportionally transferred to the cathode of the triode 37 and leveled by the diode 41, so that the condenser 42 is always charged to full voltage after the third impulse. In the period elapsing between two impulse series the condensers 36 and 42 are slightly discharged. These fluctuations are, however, very small and are practically not indicated by the instrument 18. The voltage appearing at the cathode of the triode 44 is proportional to the voltage of the sawtooth impulse at the moment, at which the third impulse arrives, i. e. proportional to the time difference between the first and the third impulse. The instrument 18 measures the difference between the constant potential of the point 19 and the potential of the cathode of the tube 44.

It is evident that the voltage of the condenser 36 shown in Fig. 2 rises to a higher value, the greater the distance between the times $t_0$ and $t_2$. The voltage difference across the instrument 18 is correspondingly decreased in this case so that a small amplitude of the balance is indicated.

The sawtooth oscillator is adjustable in such a manner that the slope of the sides of the sawtooth voltage can be adjusted. Since the construction of the regulating device is not the same in all watches, the time difference elapsing between the individual beats at a corresponding amplitude is not the same in all watches. In order to obtain at equal amplitudes equal indications with different types of watches, the steepness of the sides of the sawtooth voltage is correspondingly adjusted.

I wish it to be understood that I do not desire to be limited to the details described in the foregoing specification and shown in the drawings for obvious modifications will occur to a person skilled in the art.

I claim:

1. A device for measuring the amplitude of the balance vibrations of an assembled watch, comprising in combination, a microphone excited by the mechanical pulsations of the watch so as to generate one set of electrical signals in response to the pulsations produced in each half period of the vibration of the watch, an amplifying stage connected to said microphone so as to amplify the electrical signals produced thereby, a voltage impulse generator connected to said amplifying stage and responsive to the first amplified signal of each set of amplified signals, a sawtooth generator fed with the voltage impulses of said voltage impulse generator and producing voltage sawtooth impulses, the time interval between two voltage sawtooth impulses being equal to the time interval between the first signals of two sets of said electrical signals, a level control device having an input connected to said amplifying stage to also receive said amplified signals, the time constant of said level controlling device being larger than the time constant of the damping of the natural resonance frequencies of said watch and said microphone, said level control device having an output voltage which increases steeply at the first amplified signal of each set of amplified signals, a differentiating device supplied with the output of said level controlling device so as to generate sets of sharp controlling impulses separated by time intervals being proportional to the time intervals of said mechanical pulsations of the watch, a testing device connected to said sawtooth generator and controlled by said sharp controlling impulses to apply said voltage sawtooth impulses to a condenser under the control of said sharp controlling impulses, so as to apply to said condenser a potential being proportional to the time interval between the first and the last impulses of each set of said sharp controlling impulses, and an indicating instrument indicating the difference between a constant voltage and a voltage proportional to the maximum voltage across said condenser.

2. A device as claimed in claim 1, wherein the testing device includes two pairs of diodes connected in cascade, said sawtooth generator being connected to the midpoint of one of said cascades and said condenser being connected to the midpoint of the other of said cascades.

No references cited.